May 4, 1926.
C. T. WEYMANN
CLOSED ROAD MOTOR VEHICLE BODY
Filed March 26, 1925
1,583,239
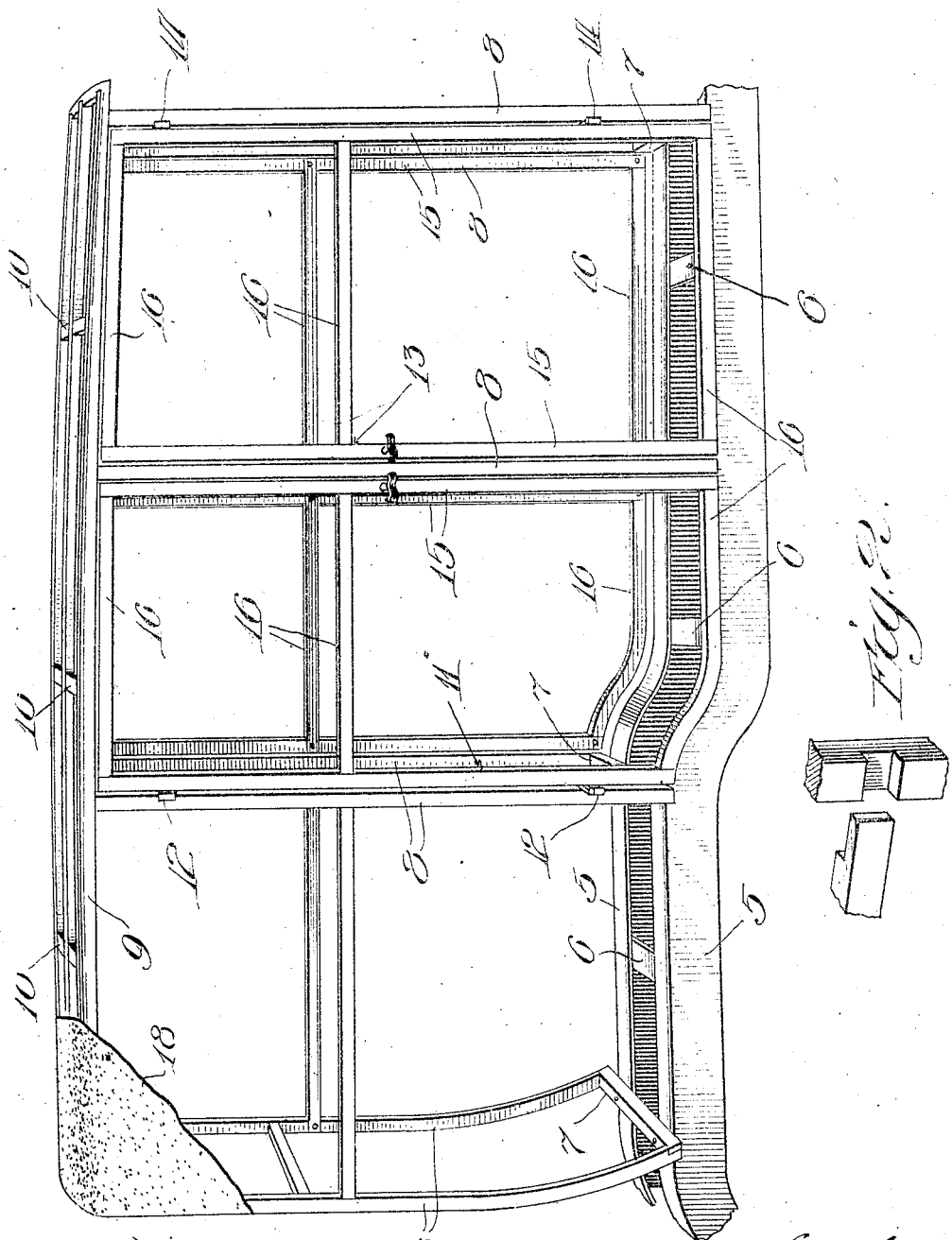
Inventor:
Charles Terres Weymann
By Rector, Hibben, Davis and Macauley
Attys Patented May 4, 1926.

1,583,239

UNITED STATES PATENT OFFICE.

CHARLES TERRES WEYMANN, OF PARIS, FRANCE.

CLOSED ROAD MOTOR VEHICLE BODY.

Application filed March 26, 1925. Serial No. 18,343.

*To all whom it may concern:*

Be it known that I, CHARLES TERRES WEYMANN, a citizen of the French Republic, and resident of the city of Paris, France, have invented certain new and useful Improvements in Closed Road Motor Vehicle Bodies, of which the following is a specification.

This invention relates to closed bodies for road-motor vehicles and the principal object of the invention is to construct the closed body of light flexible or pliable wooden pieces or timbers so that the entire body is flexible and hence free to weave, warp or flex in harmony or synchronism with the chassis without danger of permanent distortion of the parts or pulling apart of the joints.

In the accompanying drawings, Figure 1 is a perspective view of the skeleton frame of a body, embodying the present invention, the skeleton being shown mounted on the side sills of a chassis frame; Fig. 2 is a view showing one form of rigid joint between two of the wooden pieces of the skeleton.

The chassis frame comprises the usual metal channel-shaped side sills 5 connected by cross beams 6.

Mounted directly on the side sills are transverse cross bars 7 which are flexible and project beyond the side sills. Mounted on the ends of these cross bars and secured thereto by rigid joints are the vertical posts 8. Mounted on the tops of the posts on each side of the vehicle is a longitudinal wooden rail 9. Transverse top bows 10 are secured to the rails 9. The rear doors 11 are positioned between the two middle posts on both sides and are hung on hinges 12 secured to one of the posts. The front doors 13 are mounted between the two front posts on both sides and are hung by the hinges 14 on the front posts. Each of these doors comprises the vertical pieces 15 and the transverse top, bottom and intermediate pieces 16.

The pieces of the skeleton are connected together by rigid joints, such as shown in Fig. 2, and the pieces forming each of the doors are likewise connected together by joints of any approved construction. All parts of the skeleton frame, including the doors, are formed of thin pliable or flexible wood which is adapted to yield and bend so that the body is free to weave with the chassis frame. It will be noted that the spaces or gaps between the doors and the vertical posts, forming the door frames, are of considerable width so that the body is free to weave and the doors do not bind or contact with the vertical posts. The exterior of the body skeleton and doors, except at the window openings, are covered exteriorly with fabric 18, such as imitation leather for example, or with genuine leather which would serve the same as woven fabric, and this fabric covering, which is used in place of the panels of sheet metal ordinarily used heretofore to enclose automobile bodies, does not interfere with the weaving action of the body.

From the foregoing it will be apparent that the invention consists essentially in the provision of a closed road motor vehicle body having a fabric covered skeleton formed of thin wooden pieces which are themselves flexible or pliable so that the entire body may freely weave and flex with the chassis without any deleterious results, while at the same time the weight and cost of vehicle bodies are considerably reduced.

I claim:

1. In a closed road motor vehicle body, constructed to weave with the chassis frame, a skeleton comprising thin flexible wooden pieces, including roof pieces, adapted to flex relative to each other, rigid joints connecting the wooden pieces together, and a fabric covering around the skeleton to permit it to weave with the chassis frame.

2. In a closed road motor vehicle body, constructed to weave with the chassis frame, a skeleton of thin flexible wooden pieces consisting of transverse base pieces, vertical pieces forming posts and supported on said base pieces and longitudinal and transverse roof pieces supported on said vertical pieces, said pieces being adapted to flex relative to each other, rigid joints connecting said pieces together, and fabric covering around said skeleton and permitting the same to weave with the chassis frame.

3. In a closed motor vehicle body, constructed to weave with the chassis frame, the combination of a skeleton comprising thin flexible wooden pieces, consisting of vertical pieces forming posts on each side, longitudinal top pieces supported on the upper ends of said vertical pieces and transverse top pieces, the pieces being adapted to flex or bend relative to each other, rigid joints connecting the pieces together, doors between certain of said vertical posts and formed of thin flexible wooden vertical and transverse pieces permitting the doors to flex or weave, and fabric coverings for the skeleton and doors permitting the same to flex or weave.

CHARLES TERRES WEYMANN.